US010638845B2

(12) United States Patent
Pierce

(10) Patent No.: US 10,638,845 B2
(45) Date of Patent: May 5, 2020

(54) HYGIENIC HEADREST COVER

(71) Applicant: Thomas Pierce, NE Atlanta, GA (US)

(72) Inventor: Thomas Pierce, NE Atlanta, GA (US)

( * ) Notice: Subject to any disclaimer, the term of this patent is extended or adjusted under 35 U.S.C. 154(b) by 0 days.

(21) Appl. No.: 16/430,826

(22) Filed: Jun. 4, 2019

(65) Prior Publication Data

US 2019/0343290 A1 Nov. 14, 2019

Related U.S. Application Data

(63) Continuation-in-part of application No. 15/357,292, filed on Nov. 21, 2016.

(51) Int. Cl.
*A47C 7/62* (2006.01)
*B60N 2/879* (2018.01)
*B60N 2/60* (2006.01)
*B60N 2/80* (2018.01)
*B61D 33/00* (2006.01)
*B60N 2/885* (2018.01)

(52) U.S. Cl.
CPC ............ *A47C 7/386* (2013.01); *B60N 2/6063* (2013.01); *B60N 2/879* (2018.02); *B60N 2/885* (2018.02); *B60N 2002/899* (2018.02); *B61D 33/0035* (2013.01)

(58) Field of Classification Search
CPC ....... A47C 7/386; A47C 31/11; B60N 2/6063; B60N 2/5858; B60N 2/885; B60N 2/879; B60N 2002/899; B61D 33/0035

USPC ................................................. 297/220, 224
See application file for complete search history.

(56) References Cited

U.S. PATENT DOCUMENTS

| 5,538,323 A * | 7/1996 | Henkel .................... B60N 2/80 297/397 |
| 9,845,034 B1 * | 12/2017 | Lew ...................... B60N 2/6081 |
| 2009/0121530 A1 * | 5/2009 | Yasuda ................ B60N 2/5816 297/224 |
| 2012/0200130 A1 * | 8/2012 | Brinker .................. A47C 31/11 297/220 |
| 2013/0088054 A1 * | 4/2013 | Atchison .............. B60N 2/6063 297/188.01 |
| 2016/0318430 A1 * | 11/2016 | Umlauf .................... B60N 2/90 |

* cited by examiner

*Primary Examiner* — Milton Nelson, Jr.
(74) *Attorney, Agent, or Firm* — Melvin K. Silverman

(57) ABSTRACT

A stretchable hygienic cover, for utilization with an existing variable geometry vehicle headrest, having an ability to conform itself to dimensions of the existing variable geometry vehicle headrest underlying the stretchable hygienic cover when engaged includes a stretchable, breathable, moisture-absorbent fabric. Further provided in the stretchable hygienic cover is a closable opening allowing the fabric to stretchably fit over an existing variable geometry vehicle headrest, wherein the closable opening may stretch and retract in size to grip on to an existing variable geometry vehicle headrest. The fabric includes at least two vertical internal bands of resilient material having a greater modulus of elasticity than that of said fabric to allow for a secure engagement to the surface of the headrest. These bands are secured within said fabric.

2 Claims, 7 Drawing Sheets

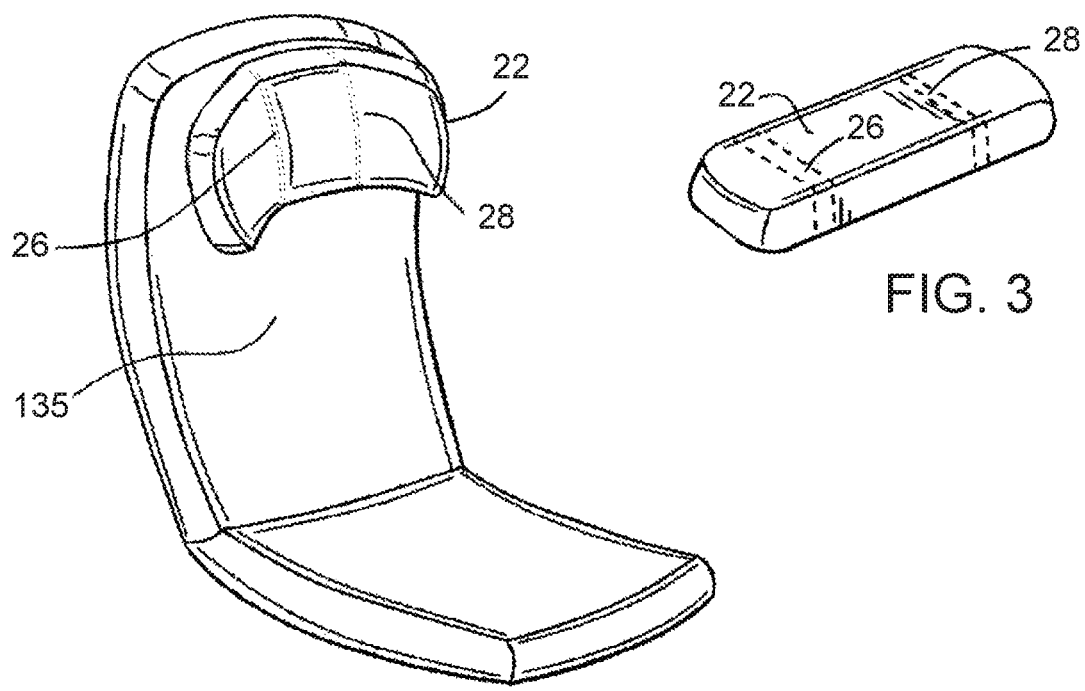

HYGIENIC HEADREST COVER

REFERENCE TO RELATED APPLICATION

This application is a continuation in part of application Ser. No. 15/357,292, filed Nov. 21, 2016, which is incorporated by reference in its entirety.

BACKGROUND OF THE INVENTION

1. Field of the Invention

The present invention relates to hygienic headrest covers for headrests of vehicles inclusive of airplanes, cinema seats, automobiles, buses, trains and boats, in which the headrest exhibits an adjustable geometry.

2. Description of the Related Art

For purposes of illustration, most references made herein are to the use of headrest covers on airline carriers and cinema seats, but the invention applies to all forms of transportation, public conveyances, and facilities in both commercial and residential settings, i.e., buses, trains, boats, automobiles, medical/dental facilities, entertainment venues, offices, homes and the likes.

Ever since the introduction of the headrest portion of a seat on transportation vehicle seats, and more recently on cinema theaters, the issue of the headrest becoming soiled and potentially contaminated by constant contact with multiple occupants has been a concern to respective industries, health agencies, and the informed general public. This concern is especially acute on long transit transportation and cinema theaters where the seat occupants constantly rub their scalps against the headrest while assuming a more relaxed position. Such continuous contact with the headrest results in it quickly becoming soiled, creating a potentially unsanitary surface, which may act as a conduit to transfer contaminants to subsequent occupants.

High traffic surfaces harbor microorganisms that can contaminate a multitude of people. The present invention is designed not only to prevent possible soiling of the head-rest portion of a seat, but also the possibility of transmission of the scalp, skin, parasitic and other diseases from any of the many previous users of the seat to another user. This possibility of transmission increases due to the fact that most people, in many high traffic and crowded settings, use the headrest portion of seats as handle bars. They are used as leverage to get in, out and up from seats, as balancing tools while moving down the isle or simply as a place to set ones hands while standing, chatting, or waiting to disembark.

Throughout the useful life of commercial airplanes and cinema theaters, seats can often be occupied by thousands of different individuals of various degrees of cleanliness and health conditions before seats are ever cleaned, replaced, or reupholstered. In many cases, the cleaning process might not sufficiently sanitize the headrest. Most health agencies cite international travel as a major factor in the global spread of contagious diseases. If headrest surfaces are not consistently cleaned after each occupant, the seats can potentially expose a multitude of future occupants to serious health hazards which could later be transferred and spread across entire communities.

Resting one's head on the headrest of an unprotected public seat could be the equivalent of resting ones head on a hotel pillow that has been used by multiple individuals, without changing the pillow casing. No one well informed of the potential risk and consequences would willingly rub their head against a stranger's scalp, much less with that of the hundreds of individuals with different degrees of hygiene and unknown health conditions that have used the seat before them. For these reasons alone, it might be concluded that in an effort to reduce or control the effects of a potential pandemic, public conveyances and entertainment venues might appropriately be required to provide sanitized covers after each leg of travel and prior to every show-time, respectively. If such a mandate were to be imposed today, many public carriers would be under prepared to comply with such a directive. Many transportation carriers would not be able to absorb the time and financial burden required in complying with such a legal requirement, and those industries that did, would likely pass the incremental cost directly onto the customers.

The airline industry and other agencies have long sought alternative means for efficiently addressing said problems without imposing further stress on an industry already under economic pressures. One reason airlines do not provide protective covers to passengers is the fact that most, if not all presently available headrest covers, are too costly to provide. They require extensive handling and are considered invasive to the seat, often requiring attachment elements to be previously and/or permanently embedded onto the seats.

An even more deterrent factor materializes with the use of presently available reusable headrest covers. The reusable versions of headrest covers are primarily made of cloth, leather, or towel like material. The laundering of such covers is an expensive operation, requiring additional handling for packaging and transporting it to and from the processing locations. The life time replacement cycle for reusable covers primarily depends on how often they are cleaned, as the laundering process deteriorates the fabric, its texture, and its colors.

In summary, a number of issues presently face carriers when using any of the currently available headrest covers and it becomes apparent that these issues are major deterrents to the consistent use of headrest covers. These issues include: the cost to purchase; the cost to incorporate required engagement elements onto existing and new seats; the labor cost required to implement a one cover per passenger cycle; the cost of replacing all covers after each individual use; the cost of discarding fresh covers, not being able to distinguish the used from the new covers; the cost of shipping, laundering, storing and handling of reusable covers; the cost associated with potential delays to flight schedules contribute an unnecessary burden on industries already in distress.

The above harmful impact to use frequency for headrest covers therefore obscures a cover's ultimate function: to protect individuals and communities from potential contamination. In addition to protection, the use of headrest covers provides the concerned public with an added advantage; namely, user peace of mind. Once again in summary, all reusable and disposable replaceable headrest covers previously developed, suffer from a number of critical disadvantages that hinder the consistent use of said covers.

Research indicates that one convenient solution for such a critical and global dilemma would be to make available to applicable industries and the general public, an economical, replaceable, compact, disposable headrest cover that can be installed and removed easily and disposed of by the seat occupants themselves. If the travel community and general public have not yet publicly raised concerns, it is mainly because they are uninformed about such facts.

To minimize the potential for transmission of any virus, skin condition, or communicable diseases, the headrest cover should be available on a consistent basis. International carriers can be a major factor in the spread of a disease globally. Getting ill while aboard an airplane is a serious matter. From the common cold to more serious infections, air passengers are more exposed to germs and viruses than ever before. High traffic surfaces harbor microorganisms that can contaminate a multitude of people. The present invention is designed not only to protect against soiling of the head-rest portion of the seat, but also the possibility of transmission of scalp, skin and other diseases from any prior user of the seat to others.

Representative prior art in patents is reflected in U.S. Pat. No. 3,654,059 (1972) to Zisblatt; U.S. Pat. No. 7,726,735 (2010) to Resendiz; and U.S. Pat. No. 8,191,969 (2012) to Dermaris.

SUMMARY OF THE INVENTION

A stretchable hygienic cover, for utilization with an existing variable geometry vehicle headrest, having an ability to conform itself to dimensions of the existing variable geometry vehicle headrest underlying the stretchable hygienic cover when engaged includes a stretchable, breathable, moisture-absorbent fabric. Further provided in the stretchable hygienic cover is a closable opening allowing the fabric to stretchably fit over an existing variable geometry vehicle headrest, wherein the closable opening may stretch and retract in size to grip on to an existing variable geometry vehicle headrest. The fabric includes at least two vertical internal bands of resilient material having a greater modulus of elasticity than that of said fabric to allow for a secure engagement to the surface of the headrest. These bands are secured within said fabric.

Additionally provided is a kit including the hygienic cover, as described above, and further including a pre-packaged sanitizing wipe, and a container to encapsulate the pre-packaged sanitizing wipe and a compressed stretchable hygienic cover.

Further provided is a method for providing a kit for a hygienic headrest cover, including the steps of providing a stretchable hygienic cover, for utilization with an existing variable geometry vehicle headrest, having an ability to conform itself to dimensions of the existing variable geometry vehicle headrest underlying the stretchable hygienic cover when engaged, wherein the stretchable hygienic cover has a stretchable, breathable moisture-absorbent fabric, an closable opening allowing said fabric to stretchably fit over an existing variable geometry vehicle headrest, wherein said closable opening may stretch and retract in size to grip on to an existing variable geometry vehicle headrest, and said fabric including at least two vertical internal bands of resilient material having a greater modulus of elasticity than that of said fabric, and secured within said fabric. The method further provides the steps of providing a pre-packaged sanitizing wipe, and providing a container to encapsulate the pre-packaged sanitizing wipe and a compressed stretchable hygienic cover.

It is an object of the invention to provide for proper sanitation of otherwise unprotected headrests of public seats and seats in public carriers.

It is another object to reduce the transmissibility of skin and other medical conditions that can be transmitted by human contact.

The invention addresses a long standing need that all prior efforts have failed to adequately resolve, including the impact a cover's cost per unit, the need to make covers easy and quick to install and remove, the need to reduce the amount of handling by service personnel, the need to make covers available to individual seat occupants, the need for covers in all public seating; the need to make covers widely available; and the need for making covers available in compact and convenient packaging.

An outstanding aspect of the present invention is that the general public only be provided with an alternative for protecting themselves from potential contamination without relying on commercial carriers, cinema theaters or others to do so for them.

BRIEF DESCRIPTION OF THE DRAWINGS

FIG. 2 is a view similar to FIG. 1, however showing extensions of the underlying headrest moved toward the centerline of the seat.

FIG. 3 is an isolated view of the novel headrest cover.

DETAILED DESCRIPTION OF THE INVENTION

Figure 1:
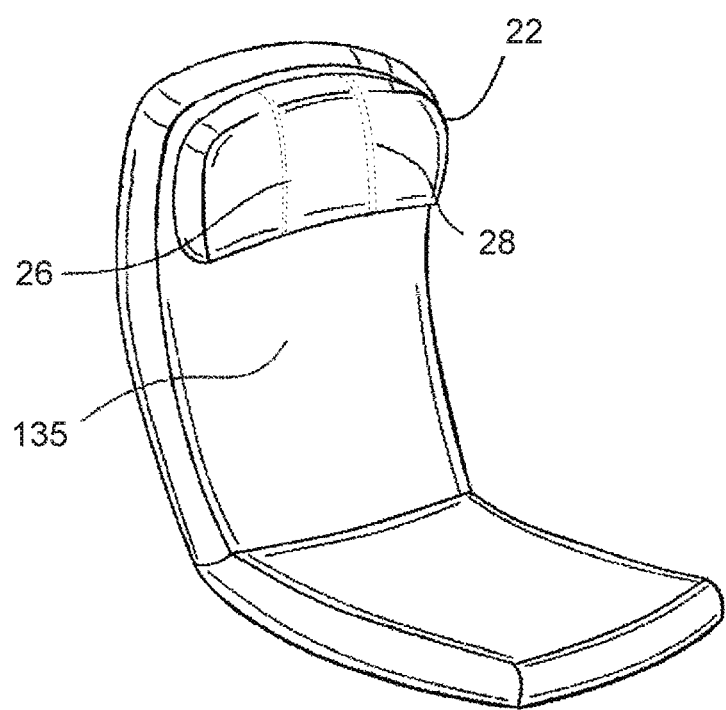
FIG. 1 is a perspective view of a cover enveloping a conventional three-part headrest.

Shown in FIG. 1 is a hygienic cover 22 covering a three-part headrest 122 (shown in FIG. 7) of an airplane seat 135, the underlying headrest 122 having a central section 114 and left and right lateral extensions 116 and 118, each of which integrally connect to the central section by respective lines of dependency. As may be seen in FIG. 1, an inner surface 30 (shown in FIGS. 4-6) of the headrest cover 22 includes internal resilient bands 26 and 28, shown in dashed lines. These resilient bands 26 and 28 allow the headrest 22 to sit flush with the headrest 122 when engaged, even when said headrest has left and right lateral extensions, as shown in FIG. 1.

As may be appreciated in FIG. 2, either or both extensions of the underlying headrest 116 and 118 may be selectably bent without the cover 22 losing its engagement with said headrest. Headrests of this type are common and have been in commercial travel use since at least 2006. See FIG. 7 marked "Prior Art." As such, a problem with headrests of this type is that, unless the cover fully and closely envelops the lines of dependency between the lateral extensions and the center panel, the entire cover cannot securely and flushly engage the complete headrest and, particularly, the lateral extensions thereof.

The instant invention addresses this problem by providing cover 22 formed of a breathable, stretchable, moisture absorbable fabric, such as a Terry or Jersey-knit fabric having therein a percent of lycra-spandex to give the fabric form-fitting properties.

A polyester or polypropylene fabric may be employed at a lower cost, if breathability or skin irritation is a lesser concern. However, cotton-based fabrics lend themselves to comfort and the use of printing of more complex fonts and pleasing patterns on the surface thereof without the use of potentially irritating inks.

Figure 4:
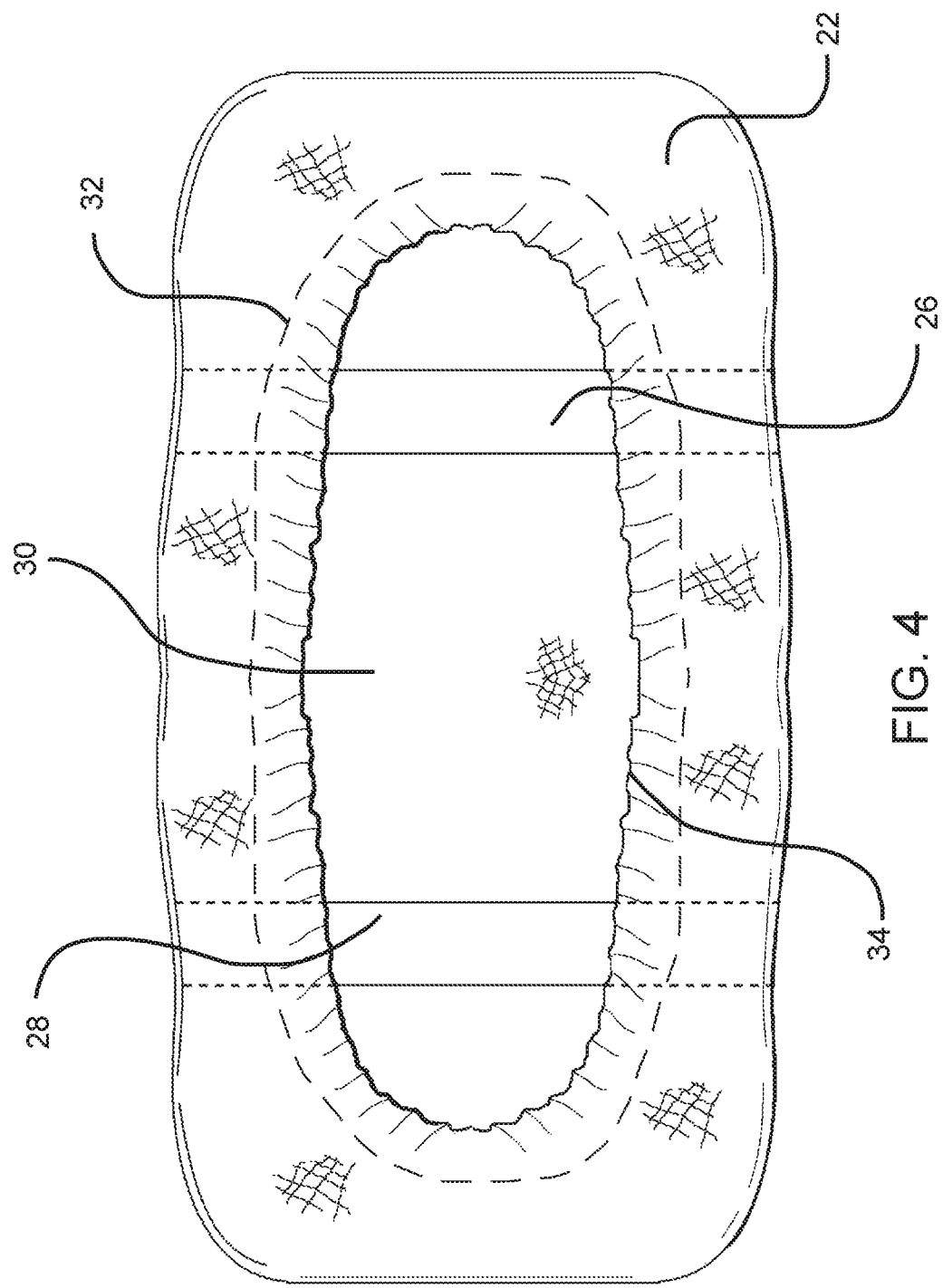
FIG. 4 is a rear view of the headrest cover.
Figure 5:
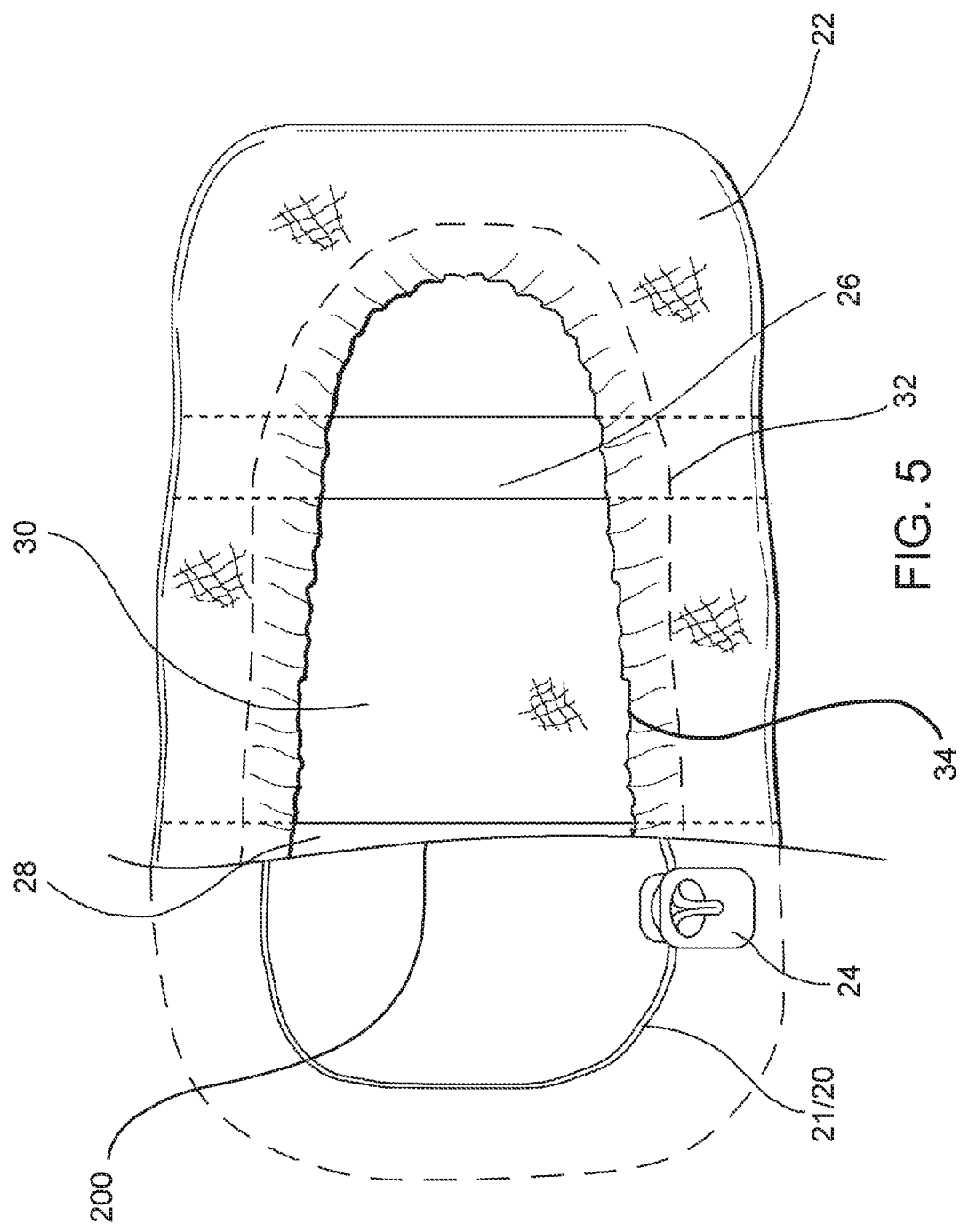
FIG. 5 is a rear view of the headrest cover with cutaway showing a chord and chord lock
Figure 6:
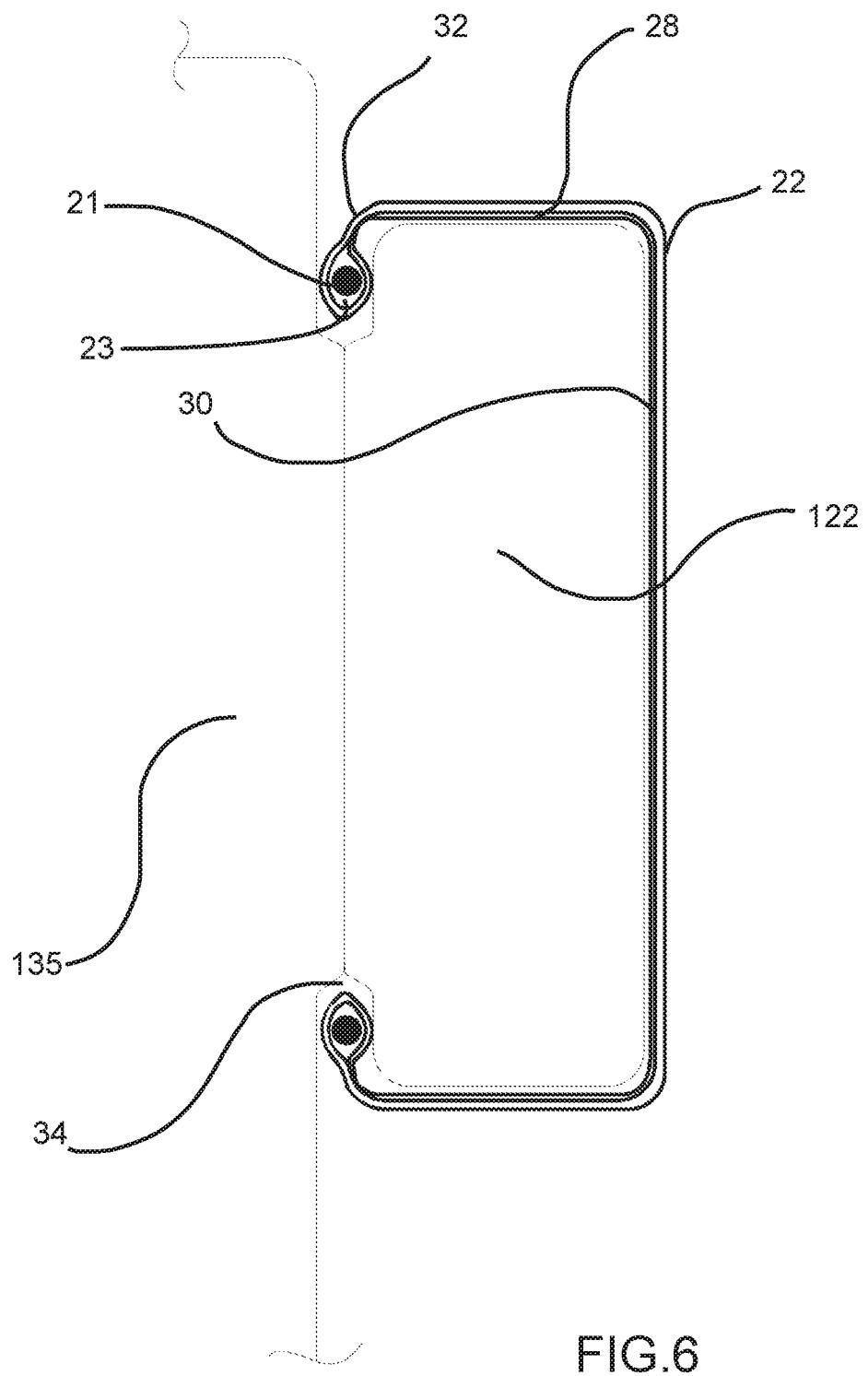
FIG. 6 is a side cross-sectional view of the headrest cover engaged on a seat headrest.
Figure 7:
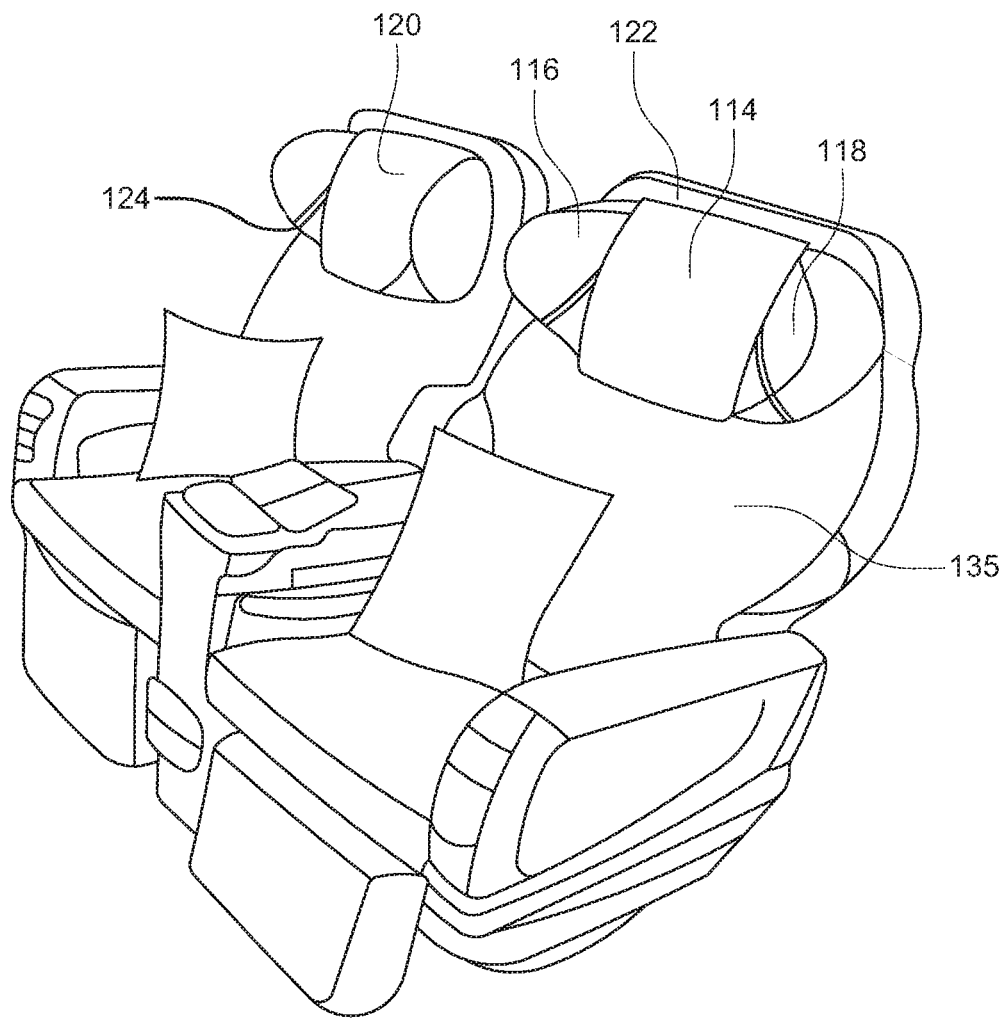
FIG. 7 is a view of prior art showing a headrest cover on a convention three-part headrest.

As may be seen in FIGS. 4-6, it is generally advantageous to include a hem 32 that encloses a closure means 20—such as a drawstring, elastic band, or chord—near the periphery of the opening 34 to assure that the cover 22 is initially positioned completely over the headrest, as shown in FIG. 1. Therein, the inclusion of a cord lock 24 permits adjustments of size of the opening of the cover to that of the particular headrest 22 when used with a chord 21.

Secured to back surface 30 of the cover 22 is a pair of resilient bands 26 and 28 that are positioned oppositely to the said lines of dependency. Said bands are selected according to their modulus of elasticity to tightly engage each of the lines of dependency such that the headrest cover closure means 20, will remain firmly engaged against all surfaces including extensions 116 and 118.

As may be noted in FIGS. 4 and 5, each band 26/28 must be firmly secured across the back surface 30 of the cover, including the underside of cover hem 32 shown in phantom in FIG. 4. As such, bands 26/28, and hem 32 plays an important role in this invention since it encloses both closure means 20 and circumferential pocket 23 (shown in FIG. 6), all of which, are essential to a firm and stable securement of the cover to the headrest when its extensions 116/118 are utilized, thus resolving the issue of such securement that exists in the prior art. (See FIG. 7).

Shown in FIG. 5 is a cut-away view of a headrest cover using a chord 21 and chord lock 24 as means of closure and securement. The chord 21 exists within the pocket created 23 by the hem 32. This closure means allows a user to place the headrest cover 22 around the headrest 122, and tighten the chord 21 to secure the cover 22 to the rear side of the headrest (shown in FIG. 6). However, other means of closure of the opening 34 may also be included. In an ideal embodiment, an elastic band as a closure means 20 may also exist inside the circumferential pocket 23 created by the hem 32. The elastic band as a closure means 20 will allow a user to stretch the opening over the headrest, and once engaged, the elastic band will contract offering a snug fit. Further, a simple drawstring as a closure means 20 may also be used inside the circumferential pocket 23. Finally, an elastic material may be heat bonded to the opening 34 of the headrest cover, thus negating the need for a hem 32 and pocket 23.

As such, the present headrest cover will fully cover a laterally adjustable headrest regardless of the degree of closure toward the seat centerline of the lateral extension thereon.

Figure 8:
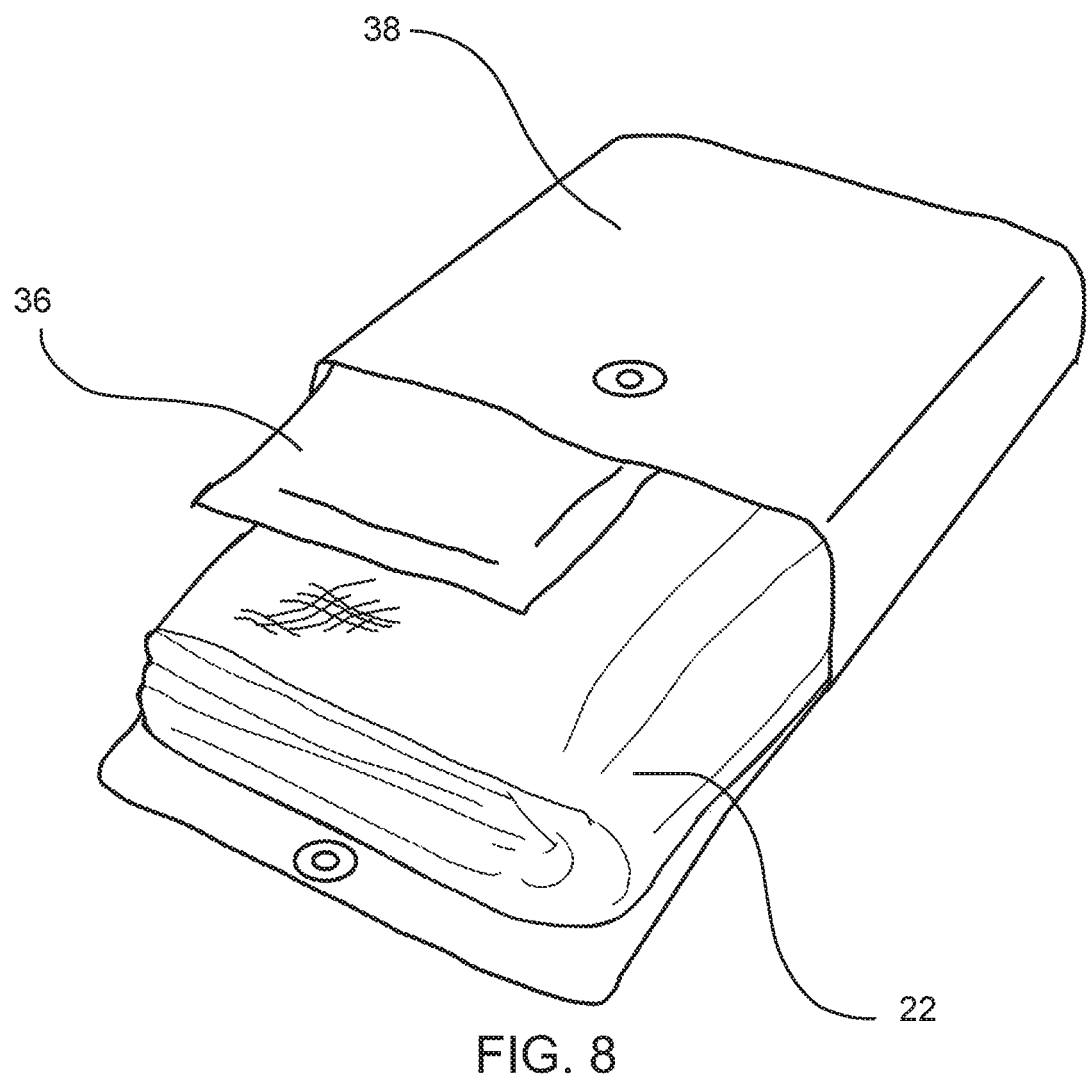
FIG. 8 is a view of a kit including the headrest cover and a sanitary wet wipe inside a container.

Prior to use of the present headrest cover, the uncovered headrest 122 and entire seat 135 should be swathed with an antibacterial product such as Wet Wipes. The headrest cover itself should be either disposable or readably washable. FIG. 8 includes a kit that will employ a folded hygienic cover 22, and a sanitary wet wipe 36 inside a container 38. The container can be reusable hardened plastic, or disposable plastic packaging.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A hygienic kit for a headrest, comprising:
   a stretchable hygienic cover, for utilization with an existing variable geometry vehicle headrest, having an ability to conform itself to dimensions of the existing variable geometry vehicle headrest underlying the stretchable hygienic cover when engaged, wherein the stretchable hygienic cover comprises a stretchable, breathable moisture-absorbent fabric, a closable opening allowing said fabric to stretchably fit over an existing variable geometry vehicle headrest, wherein said closable opening may stretch and retract in size to grip on to an existing variable geometry vehicle headrest, and said fabric including at least two vertical internal bands of resilient material having a greater modulus of elasticity than that of said fabric, and secured within said fabric;
   a pre-packaged sanitizing wipe; and
   a container to encapsulate the pre-packaged sanitizing wipe and the stretchable hygienic cover, wherein the stretchable hygienic cover is compressed.

2. A method for providing a hygienic kit for a headrest, comprising:
   providing a stretchable hygienic cover, for utilization with an existing variable geometry vehicle headrest, having an ability to conform itself to dimensions of the existing variable geometry vehicle headrest underlying the stretchable hygienic cover when engaged, wherein the stretchable hygienic cover comprises a stretchable, breathable moisture-absorbent fabric, a closable opening allowing said fabric to stretchably fit over an existing variable geometry vehicle headrest, wherein said closable opening may stretch and retract in size to grip on to an existing variable geometry vehicle headrest, and said fabric including at least two vertical internal bands of resilient material having a greater modulus of elasticity than that of said fabric, and secured within said fabric;
   providing a pre-packaged sanitizing wipe; and
   providing a container to encapsulate the pre-packaged sanitizing wipe and the stretchable hygienic cover, wherein the stretchable hygienic cover is compressed.

* * * * *